United States Patent [19]
Niskanen et al.

[11] Patent Number: 5,762,025
[45] Date of Patent: Jun. 9, 1998

[54] DECORATIVE BIRD HOUSE

[75] Inventors: Will Niskanen, Litchfield; Randy R. Reinke, Minnetonka, both of Minn.

[73] Assignee: Forest Time Products, Inc., Litchfield, Minn.

[21] Appl. No.: 735,035

[22] Filed: Oct. 22, 1996

[51] Int. Cl.$^6$ ............................................. A01K 31/00
[52] U.S. Cl. ............................................. 119/428; 119/431
[58] Field of Search .................................. 119/428, 429, 119/430, 431, 432, 433, 434, 435; D30/110, 111; 446/478, 106, 108, 114, 115

[56] References Cited

U.S. PATENT DOCUMENTS

| | | | |
|---|---|---|---|
| D. 140,175 | 1/1945 | Hyde . | |
| D. 152,472 | 1/1949 | Hawkinson . | |
| D. 214,915 | 8/1969 | Hocker . | |
| D. 221,391 | 8/1971 | Littlejohn | D30/111 |
| D. 248,198 | 6/1978 | Gordon, Sr. . | |
| 753,599 | 3/1904 | Mason | 119/428 |
| 1,166,100 | 12/1915 | White | 119/428 |
| 1,569,066 | 1/1926 | Beiger | 446/108 |
| 1,911,921 | 5/1933 | Nijveldt . | |
| 2,951,312 | 9/1960 | Engh | 119/431 |
| 4,372,076 | 2/1983 | Beck | D30/110 |

FOREIGN PATENT DOCUMENTS

| | | | |
|---|---|---|---|
| 216523 | 8/1937 | Japan | D20/110 |
| 122434 | 8/1948 | Sweden | 119/428 |

OTHER PUBLICATIONS

Paragon Catalog, p. 2, Apr. 16, 1992.
Flower& Garden Catalog, Oct. 1994.

*Primary Examiner*—Todd E. Manahan
*Assistant Examiner*—E. Robert
*Attorney, Agent, or Firm*—Fredrikson & Byron, P.A.

[57] ABSTRACT

A decorative bird house that has interchangeable decorative segments. The decorative bird house includes a number of panels that are configured to provide an interior cavity, at least two of the panels being side panels that extend generally upwardly and have upper edges that extend lengthwise relative to the bird house. A pitched roof is attached to the upper edges of the side panels. The pitched roof has an apex that extends lengthwise and at least two sections that are separated by a slot extending between the two sections from the upper edge of one of the two panels to the upper edge of the other panel. The slot is positioned transversely to the upper edges of the panels and the apex of the roof. A thin, generally two-dimensional decorative element is disposed in the slot and securely attached to the bird house so that it extends vertically above the roof.

15 Claims, 12 Drawing Sheets

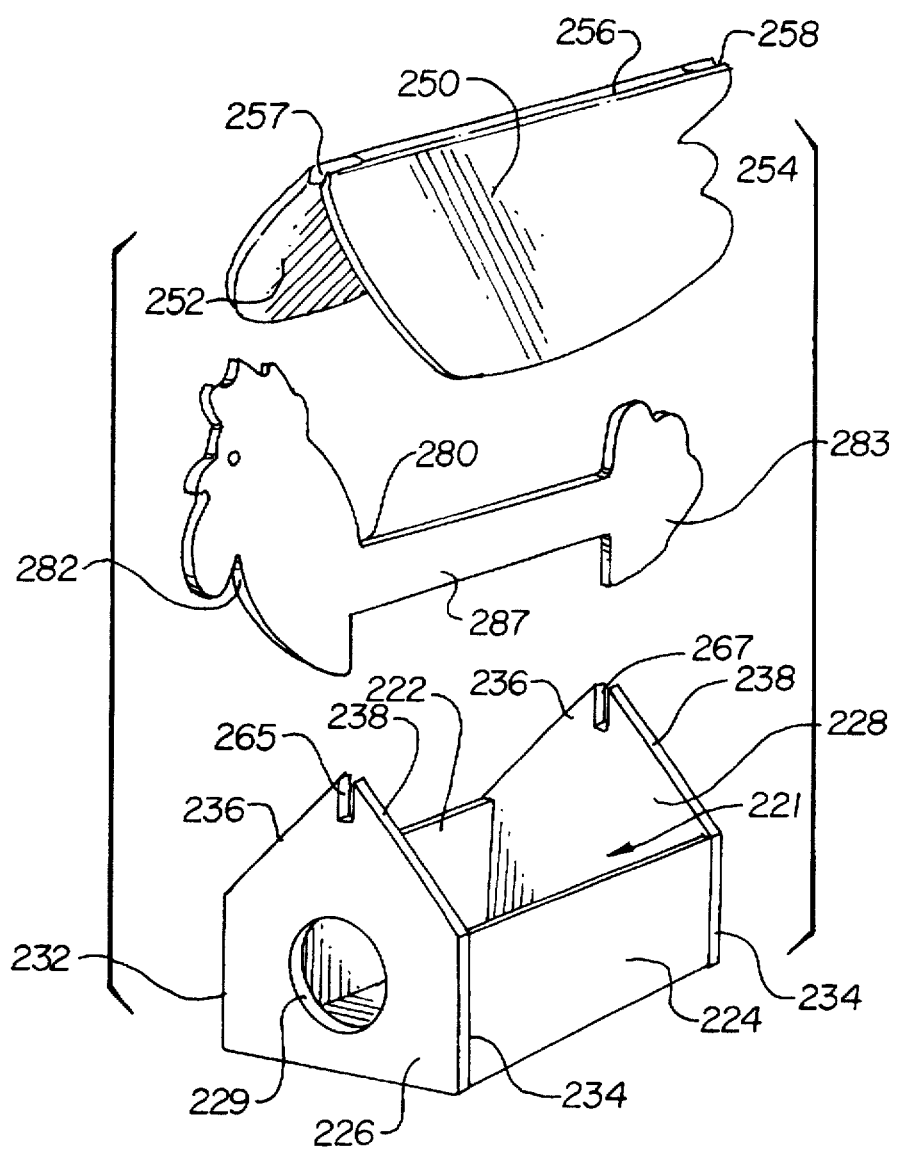

DECORATIVE BIRD HOUSE

FIELD OF THE INVENTION

The present invention relates to decorative bird houses that are cost effective to manufacture and have interchangeable decorative segments.

BACKGROUND

Bird houses are used throughout the country to encourage birds to live in areas where they can be viewed. A strong demand has developed for bird houses that are not only useful to house birds, but that are also useful to decorate the outdoor area in which the bird house is located. To meet this demand, many bird houses are also yard decorations that have ornamental features to enhance their aesthetic value.

Conventional decorative bird houses are generally expensive to manufacture because they have several customized ornamental features that require manufacturing processes and parts that are unique to each aesthetic design. As a result, the set-up costs associated with making a new decorative design are quite high because it is generally necessary to re-design the component parts and significantly change the manufacturing process to change the decorative features. Therefore, it would be desirable to develop a bird house in which the decorative features can be changed without a corresponding increase in the set-up costs.

SUMMARY OF THE INVENTION

The invention is a decorative bird house that has interchangeable decorative segments. The decorative bird house of the invention includes a plurality of panels that are configured to provide an interior cavity, wherein at least two of the panels are side panels that extend generally upwardly and have upper edges that extend lengthwise relative to the bird house. A pitched roof is attached to the upper edges of the side panels. The pitched roof has an apex that extends lengthwise and at least two sections that are separated by a slot extending therebetween from the upper edge of one of the two panels to the other. The slot is positioned transversely to the upper edges of the panels and the apex of the roof. A thin, generally two-dimensional decorative element is disposed in the slot and securely attached to one of the roof sections so that it extends vertically above the roof.

BRIEF DESCRIPTION OF THE DRAWINGS

FIG. 14 is an exploded view of another embodiment of a decorative bird house in accordance with the invention;

DETAILED DESCRIPTION OF A PREFERRED EMBODIMENT

FIGS. 1-7 depict a decorative bird house 20 and FIGS. 8-11 depict another decorative bird house 120, both of which are in accordance with the invention. Like components in FIGS. 1-11 are identified by like reference numbers.

Figure 1:
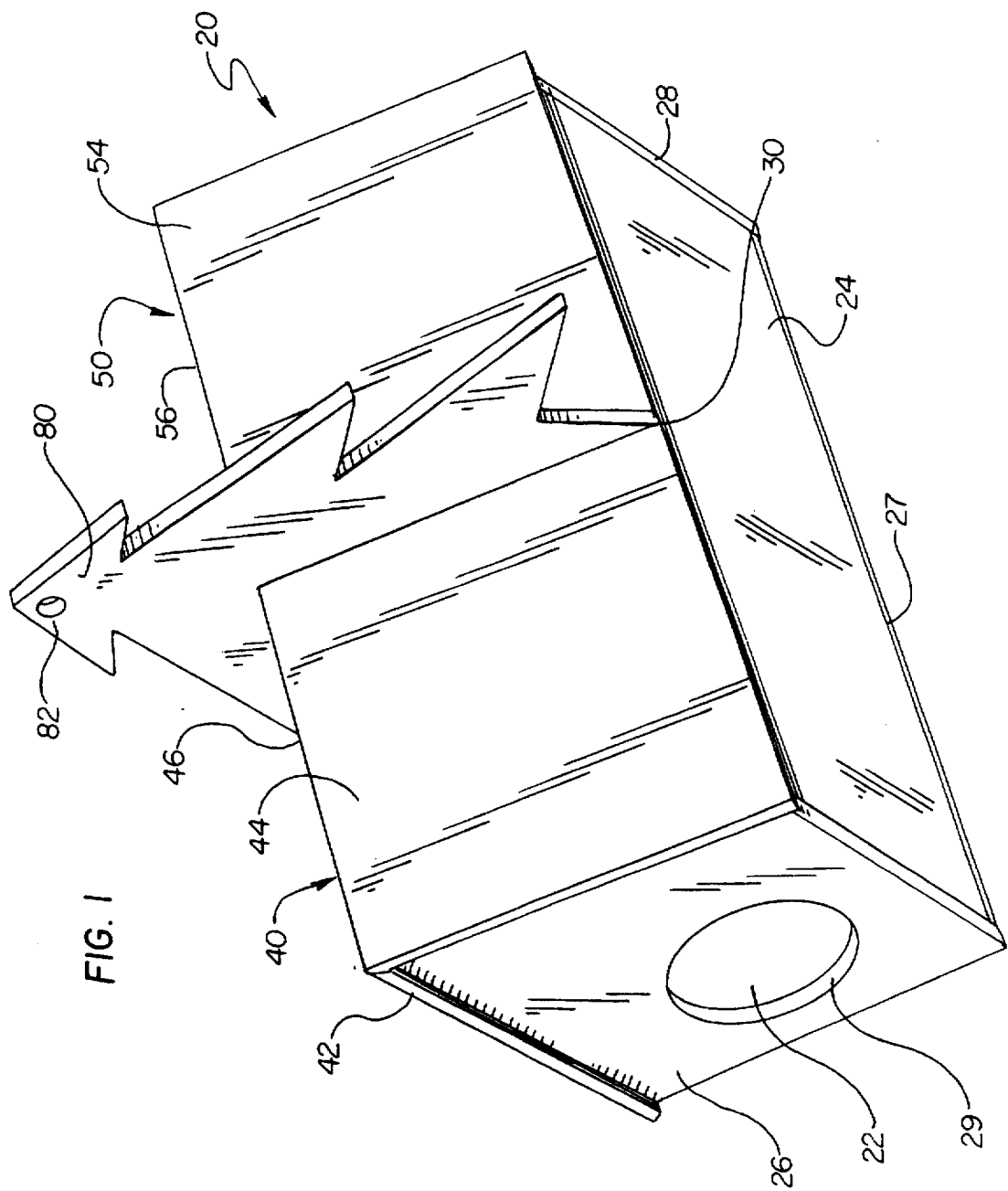
FIG. 1 is a perspective view of a decorative birdhouse in accordance with the invention.

FIG. 1 shows a perspective view of a birdhouse 20 which has a plurality of panels made from wood that are configured to define an interior cavity 21. The panels generally include side walls 22 and 24, and end walls 26 and 28. The side walls 22 and 24 are positioned along the length of the bird house 20 and extend divergently upwardly from their 5 bottom edges to form a generally V-shaped floor/wall combination. Side wall 22 is connected to side wall 24 by nailing, gluing or otherwise attaching the bottom edge of side wall 24 to the lower most portion of the interior surface of side wall 22 so that the bottom edge 27 of side wall 22 is flush with the exterior surface of side wall 24. The end walls 26 and 28 are attached to the front and rear ends of the side walls 22 and 24, respectively. A hole 29 is positioned in the end wall 26 to allow a bird to enter and exit the interior cavity 21.

Figure 2:
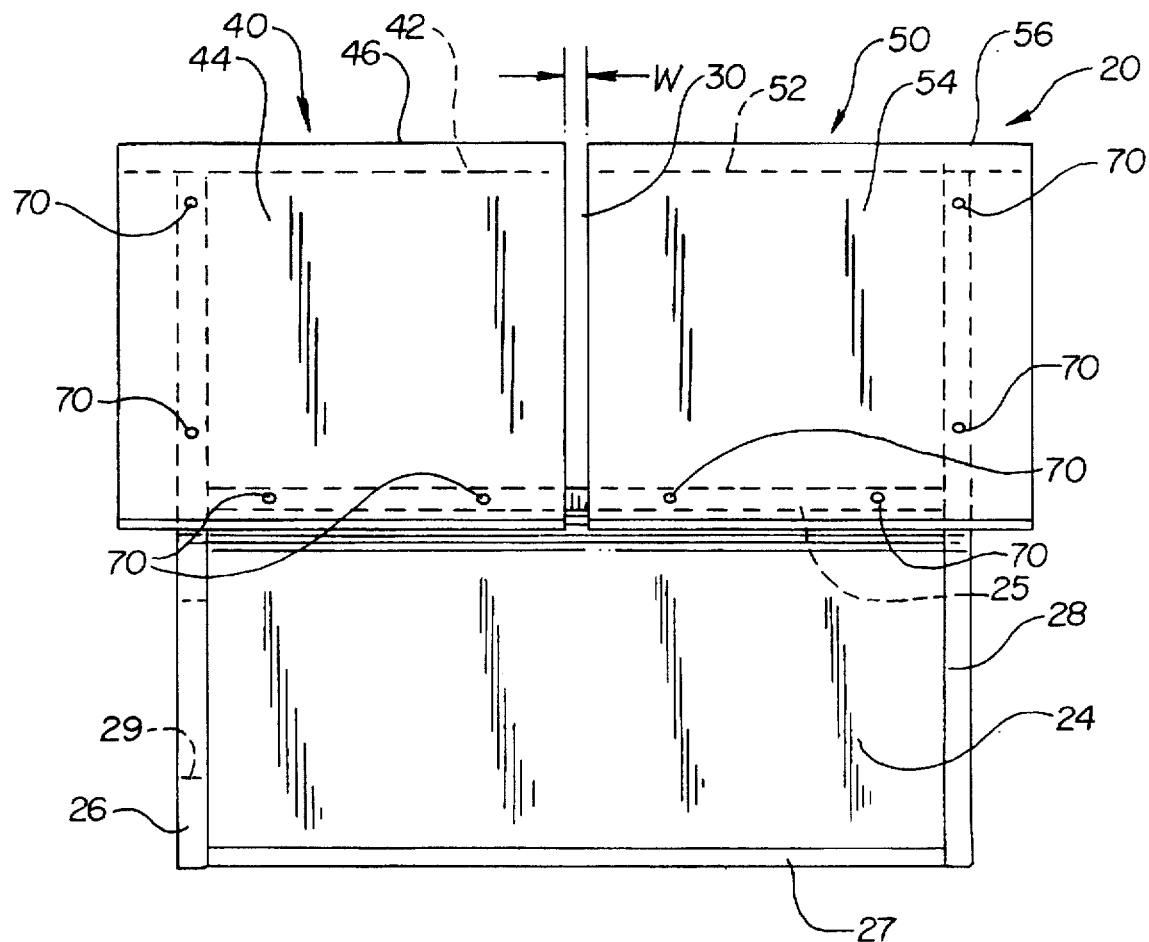
FIG. 2 is a side elevational view of a partially assembled bird house in accordance with the invention.

Referring to FIGS. 1 and 2, the interior cavity 21 is covered by a pitched wood roof having a front section 40 and a rear section 50. The front roof section 40 includes first and second segments 42 and 44, respectively, and an apex 46. The rear roof section 50 includes first and second segments 52 and 54, respectively, and an apex 56. The segments 42, 44, 52 and 54 may be attached to the end walls and side walls by a number of fasteners 70 such a nails, screws, pins, etc. Adhesives may also be used, if desired. The roof sections 40 and 50 are positioned to define a transverse slot 30 between them (best shown in FIG. 2, which shows the birdhouse without a decorative element 80 positioned in the slot 30). The transverse slot 30 extends from side wall 22 to side wall 24 and is positioned so that it is transverse to the apexes 46 and 56 and the upper edges 23 and 25 (see FIG. 5) of the side walls. The slot 30 has a width w that is slightly greater than the thickness of the decorative element 80.

The decorative element 80 is positioned in the slot 30 and extends vertically above the roof sections as shown in FIG. 1. The decorative element 80 may include a hole 82 by which it may be hung, e.g., with wire or twine. The decorative element 80 is securely fixed to one of the roof sections. The decorative element 80 may be substantially flat, and thus may be made from a thin piece of relatively rigid material such as metal, plastic or wood. The decorative element is preferably made from a metal such as tin, steel or aluminum that is stamped in the shape of a decorative object. The decorative element may be formed in almost any shape and then painted to create a two-dimensional representation of a decorative item. The invention contemplates, without limitation, decorative elements that represent items of fruit, vegetables, animals, plants and other aesthetically pleasing objects.

Figure 3:
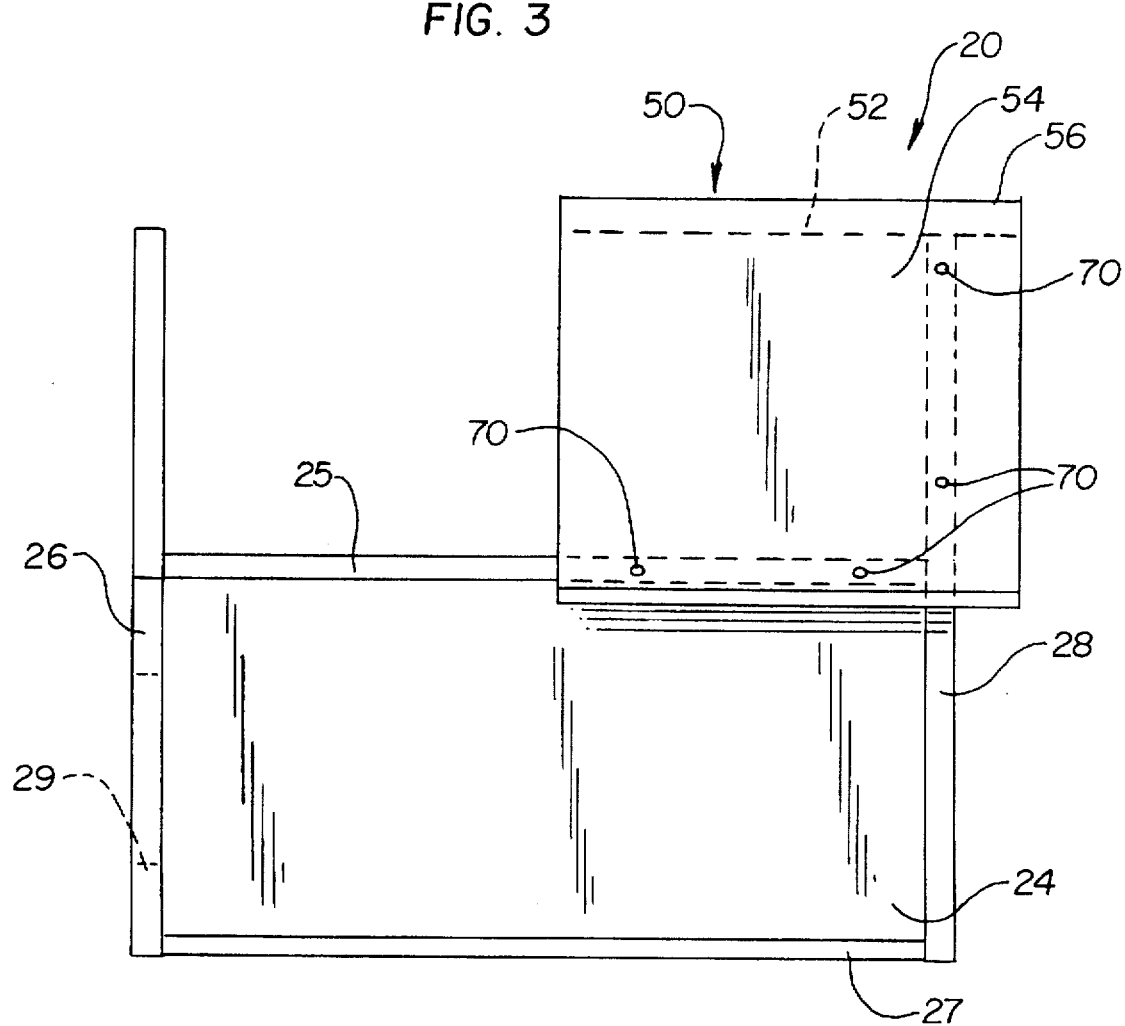
FIG. 3 is a side elevational view of a partially assembled bird house in accordance with the invention.
Figure 4:
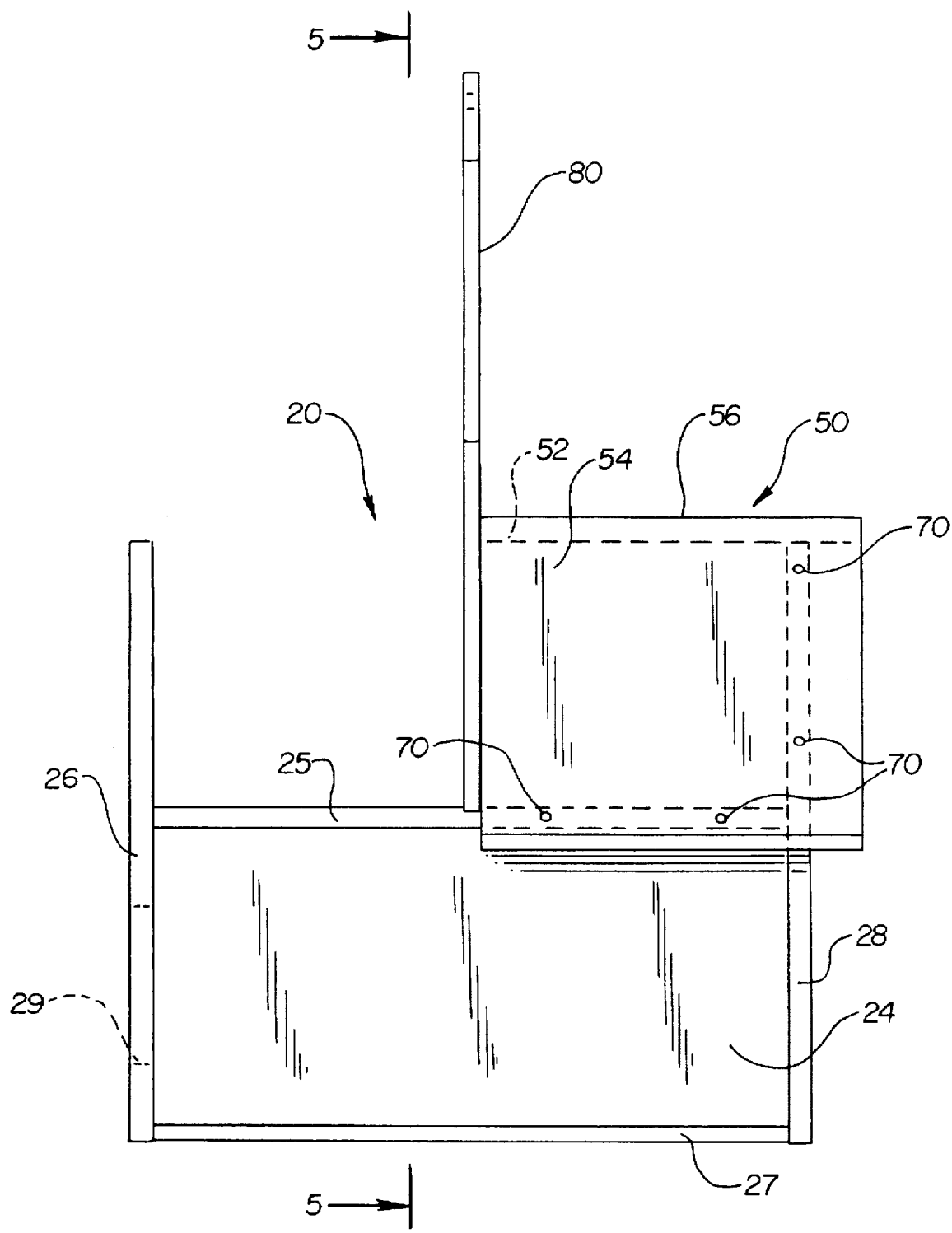
FIG. 4 is a side elevational view of a partially assembled bird house in accordance with the invention.
Figure 5:
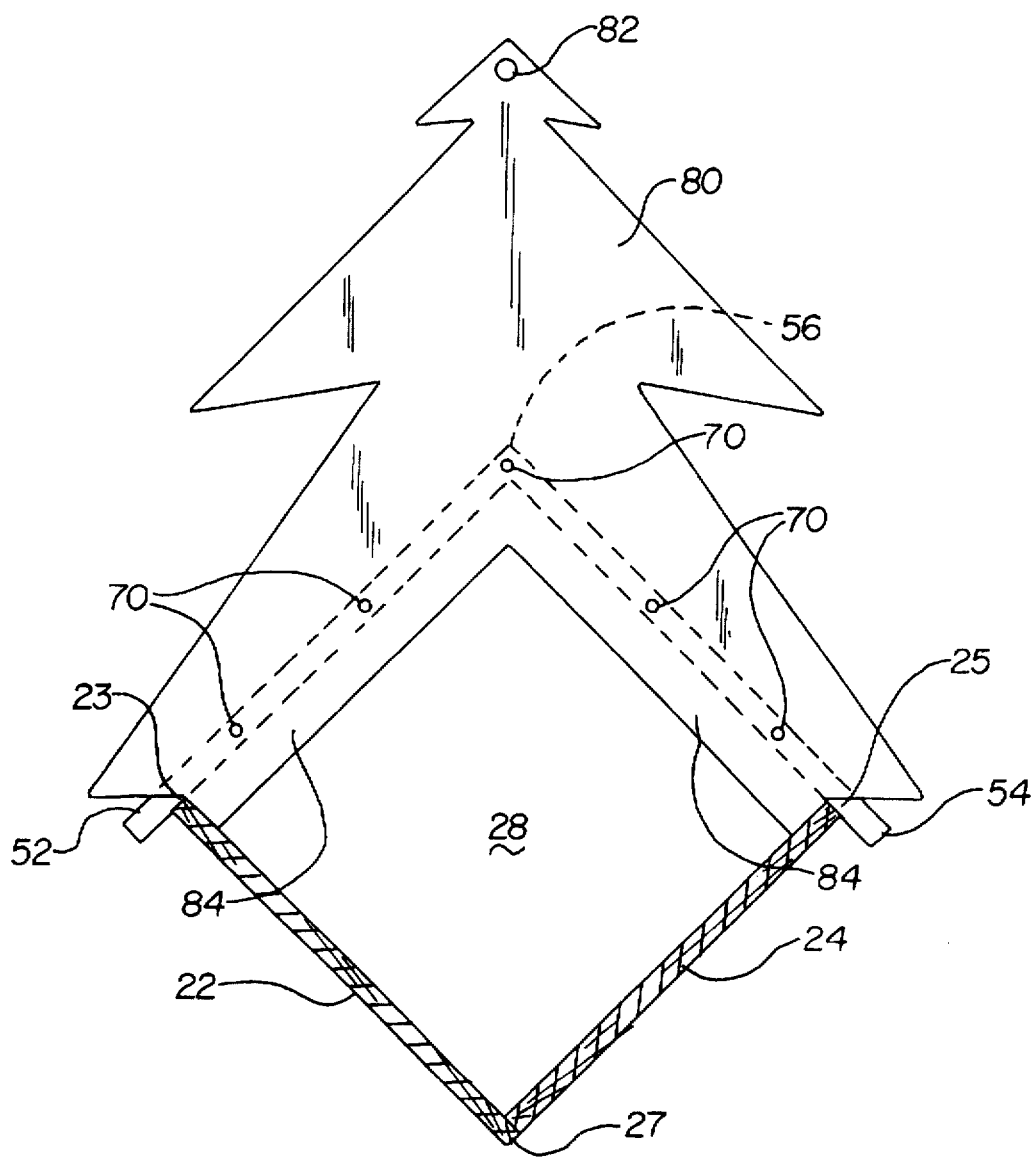
FIG. 5 is a cross-sectional view of the partially assembled bird house of FIG. 4.
Figure 6:
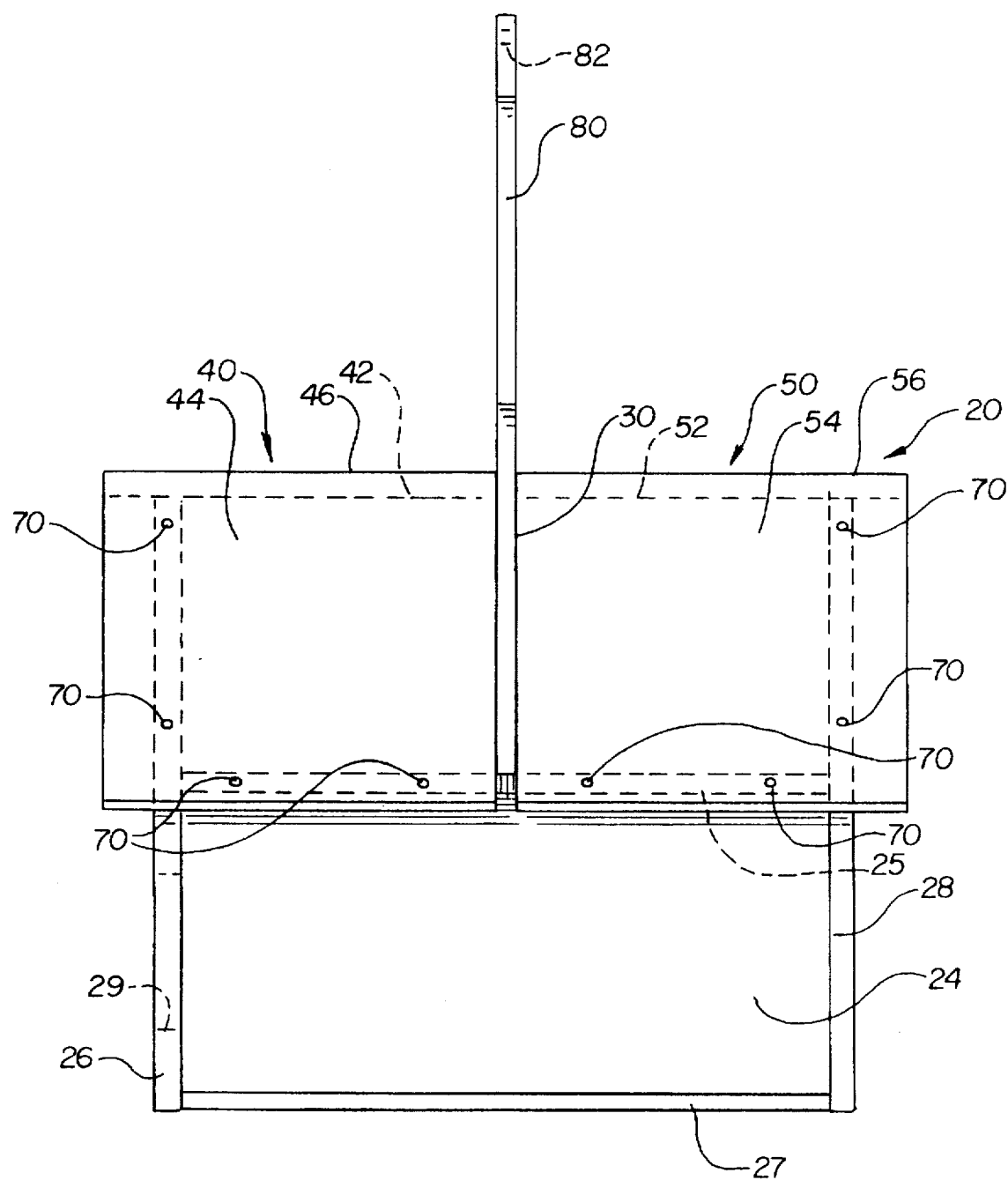
FIG. 6 is a side elevational view of the bird house of FIG. 1.
Figure 7:
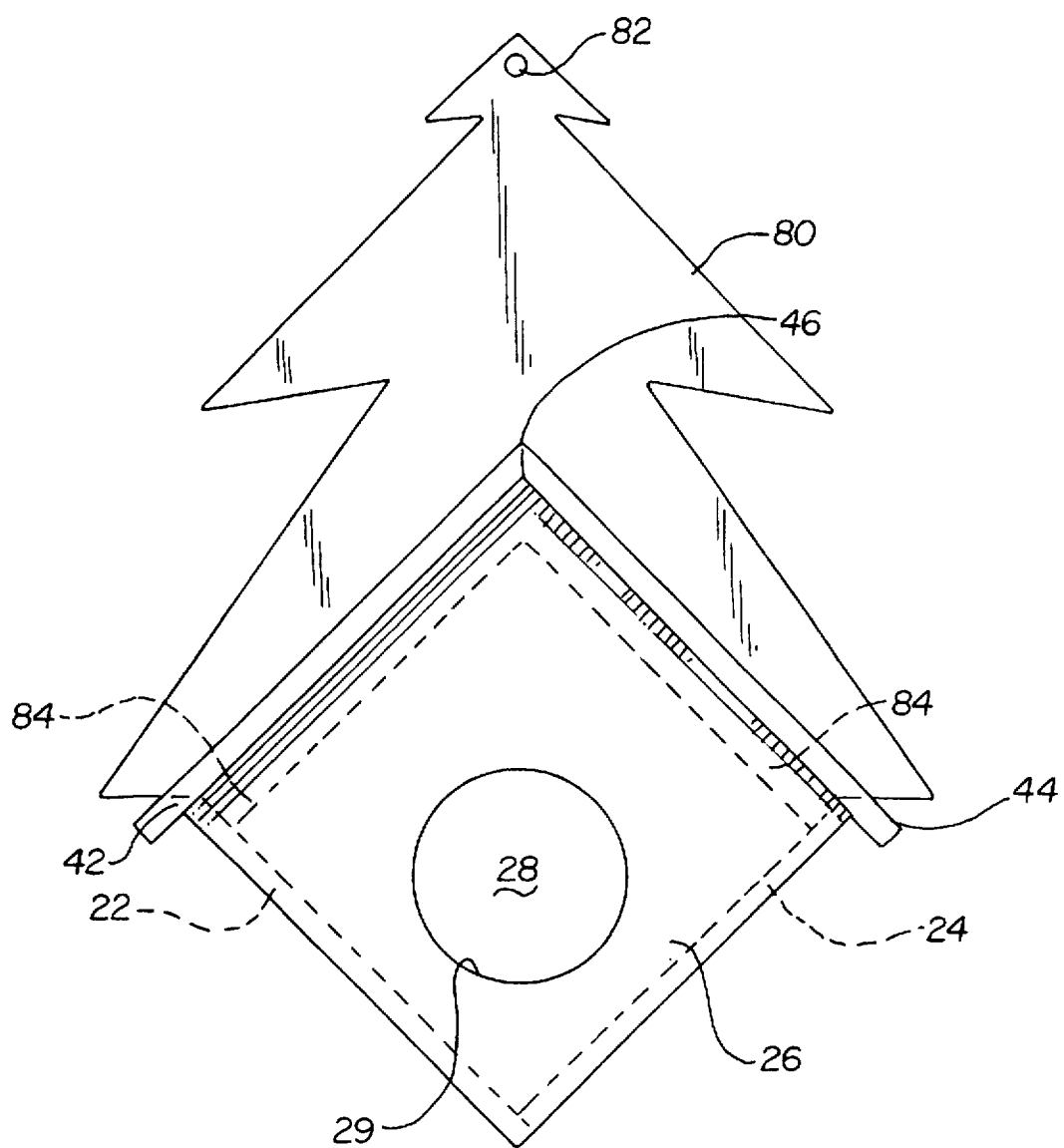
FIG. 7 is a front elevational view of the bird house of FIG. 1.

Referring to FIG. 3, the bird house 20 is assembled by fastening the side walls 22 and 24 together as set forth above, and then attaching the end wall 26 and 28 to the appropriate ends of the side walls. The second roof section 50 is attached to end wall 28 and the upper edges of the side walls by fasteners 70. Referring to FIGS. 4 and 5, the decorative element 80 is attached to the interior edges (i.e., the edges that are adjacent to the slot 30) of the first and second segments 52 and 54, respectively, by a number of fasteners 70. The decorative element 80 has fins 84 that may extend partly into the cavity 21 as shown in FIG. 5. Referring to FIGS. 6 and 7, the bird house 20 is completed by attaching the first roof section 40 to the end wall 26 and the side walls 22 and 24. The first roof section 40 may abut against the decorative element 80, but the decorative element 80 need not be attached to the first roof section 40 (though it could be, if desired).

From this description it can be seen that the present invention provides a decorative bird house 20 in which different decorative elements 80 may be interchangeably used with the same structural wood elements without a corresponding increase in set-up costs. The shape and size of the side walls, end walls and roof sections are independent from the aesthetic item that the decorative element 80 represents because the decorative element 80 is merely a two dimensional representation of an object that fits in the transverse slot 30. As such, the structural components and assembly process are the same for all bird houses having the same basic structure. For example, a number of bird houses may be assembled having a decorative element 80 representing a fir tree and then a number of additional bird houses may be made with a decorative element 80 representing a strawberry without requiring a change in any of the component parts except for the different decorative elements. Thus, since the structural elements and assembly process do not differ from one bird house to the next, the decorative elements may be changed without a corresponding increase in set-up costs.

Figure 8:
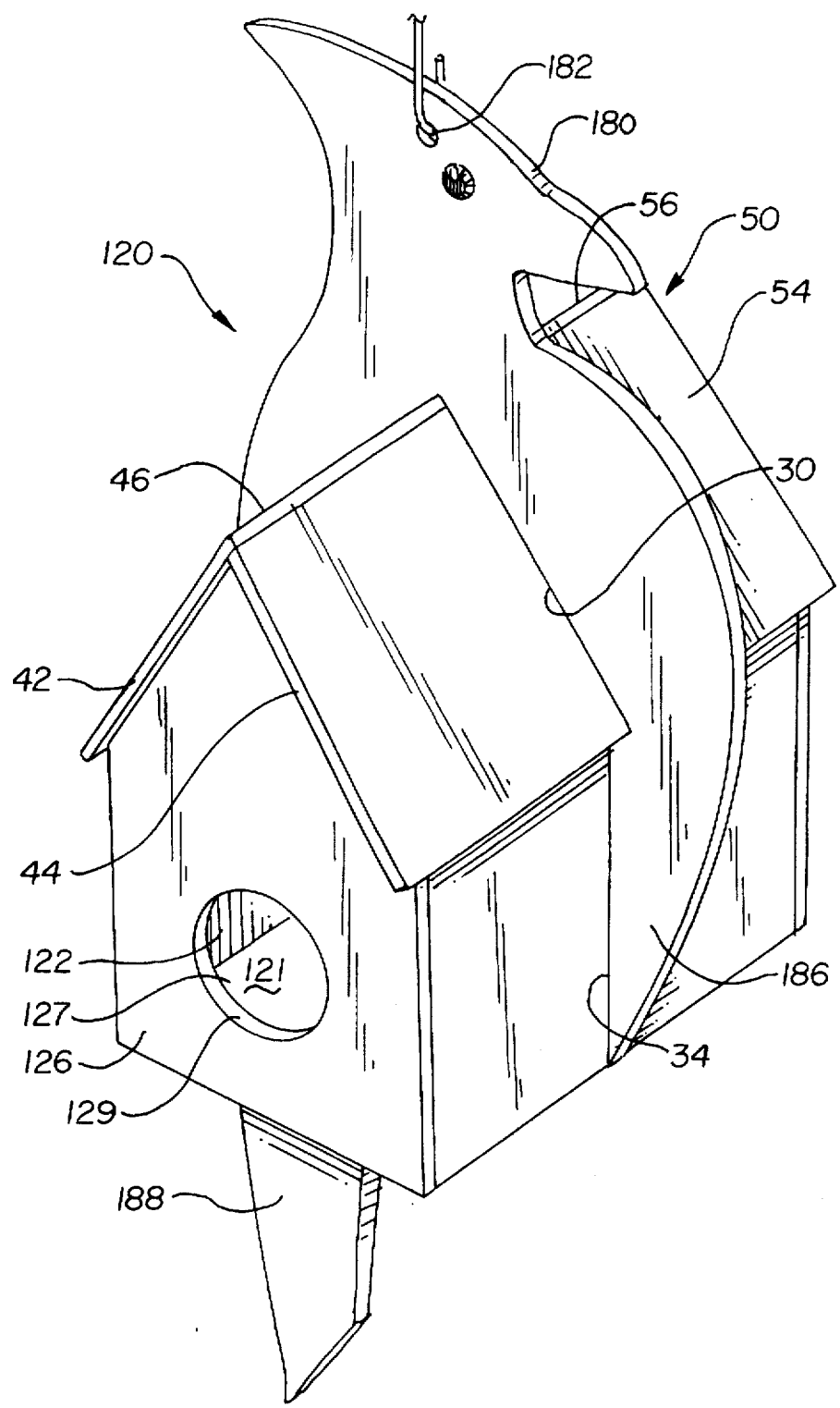
FIG. 8 is a perspective view of another embodiment of a decorative bird house in accordance with the invention.

FIGS. 8-13 depict another embodiment of the invention in which the decorative element extends vertically above the roof and horizontally away from one or both of the side walls. In FIG. 8, a bird house 120 has an interior cavity 121 defined by a plurality of panels including a base 127, side walls 122 and 124, and end walls 126 and 128. The side walls 122 and 124 are attached to one set of opposing sides of the base 127, and the end walls 126 and 128 are attached to the other set of opposing sides of the base 127 and the ends of the side walls 122 and 124. The panels are preferably made from wood and assembled together using a number of fasteners such as staples, nails or screws as described with respect to FIGS. 1-7. A hole 129 is positioned in the end wall 126 to allow a bird to enter and exit the interior cavity 121.

Figure 9:
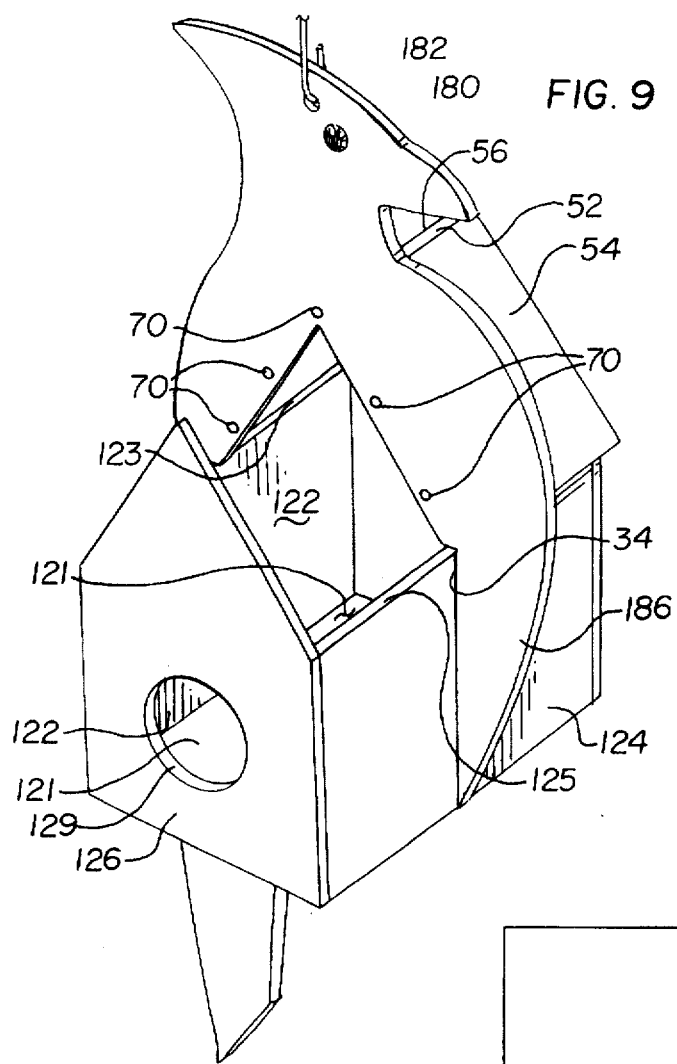
FIG. 9 is a perspective view of a partially assembled bird house in accordance with the invention.
Figure 10:
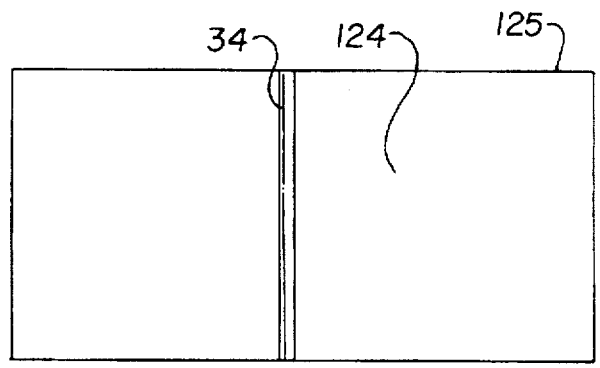
FIG. 10 is a front elevational view of a side wall of the bird house of FIG. 8.
Figure 10A:
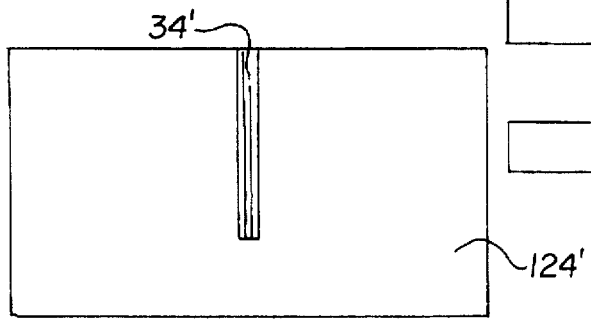
FIG. 10A is a front elevational view of a side wall of an alternative embodiment;--.
Figure 11:
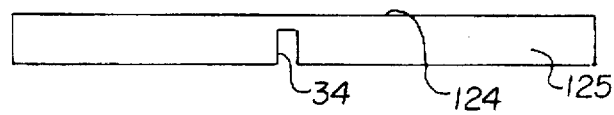
FIG. 11 is a top view of a side wall of the bird house of FIG. 8.
Figure 13:
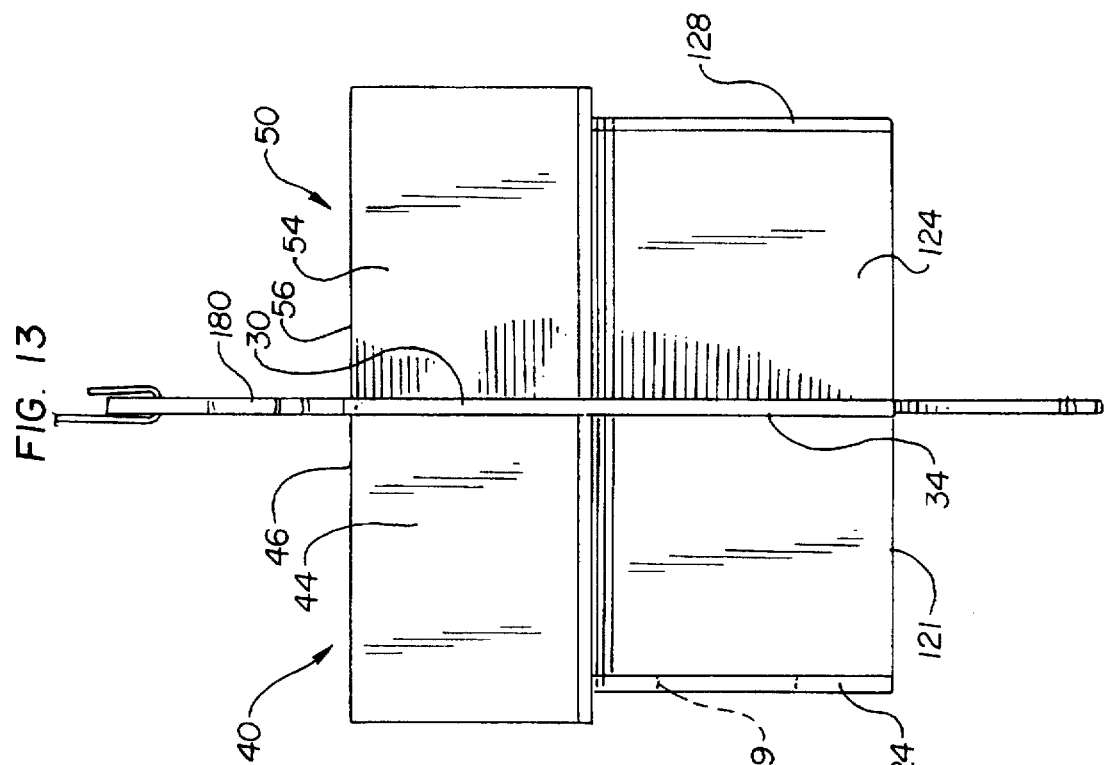
FIG. 13 is a side view of the bird house of FIG. 8.
Figure 12:
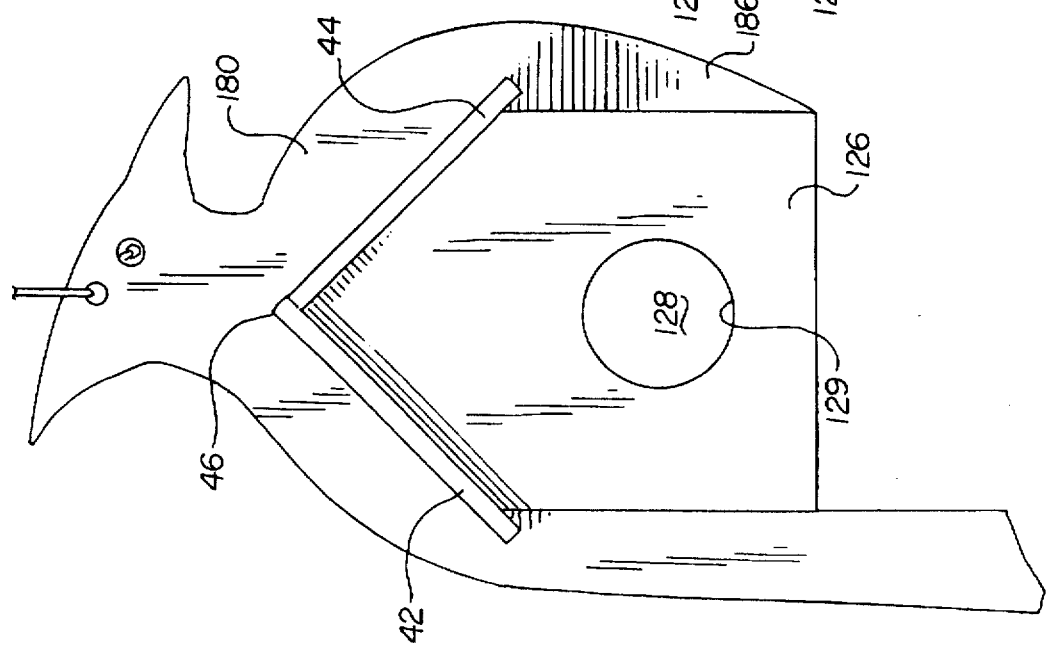
FIG. 12 is an end view of the bird house of FIG. 8.

The interior cavity 121 is covered by a pitched wood roof having a front section 40 and a rear section 50 as described in FIGS. 1-7. At least one, and preferably both, of the side walls 122 or 124 has a channel 34 extending along a portion of the height of the side wall as shown in FIGS. 9-11. In FIGS. 10-11, the slot 34 in the side wall 124 extends for the entire height of the side wall 124; in FIG. 10A, the slot 34' extends for only a portion of the height of the side wall 124'. Each channel 34 is aligned with the slot 30 between the roof sections, and a thin, generally two-dimensional decorative element 180 is positioned in the slot 30 and channels 34. By providing a slot 30 and the channels 34, the decorative element 180 extends vertically above the roof sections and horizontally out from the side walls. In the drawings the channel 34 is depicted as being a partial thickness cut in the outside surface of the side wall. Alternately, the channel may be a full thickness cut through the side wall for only a portion of the height of the side wall (the wall on opposite sides of the decorative element remaining connected by the portion of the wall that is not cut, extending below the channel). The decorative element 180 includes a hole 182 from which it can be hung, and it is securely fixed to one of the roof sections by a number of fasteners 70 in the same manner as described with respect to the bird house 20 shown in FIGS. 1-7. Alternately, the decorative element 180 could be attached to one or both of the side walls, either in addition to or instead of being attached to the roof section(s).

FIGS. 14-17 depict another embodiment of the invention in which a decorative 20 element 280 extends vertically upward from a roof 250 section on either end of a bird house 220. The roof section 250 is a thin piece of metal that is folded along its center line to form an apex 256. A front slot 257 and a rear slot 258 are positioned on opposing ends of the apex 256. When folded, the roof section 250 forms segments 252 and 254 that extend downwardly at an angle from the apex 256.

The decorative element 280 includes a cross-beam 281 which carries a front portion 282 on one end and a rear portion 283 on its other end. The decorative element 280 may be made from any thin material such as metal, plastic or wood, and preferably of tin or aluminum.

The structural portion of the bird house 220 includes side walls 222 and 224, and end walls 226 and 228. The end walls 226 and 228 have generally vertical sides 232 and 234 that correspond to the height of the side walls and inclined chords 236 and 238 for supporting the first and second segments 252 and 254 of the roof 250. Slots 265 and 267 are positioned at the apexes of end walls 226 and 228. An interior cavity 221 is defined by the side walls, end walls and a floor (not shown). The side walls, end walls and floor are preferably made from wood and connected to each other by a number of fasteners such as nails or screws. A hole 229 is positioned in end wall 226 to allow a bird to enter and exit the interior cavity 221.

Figure 15:
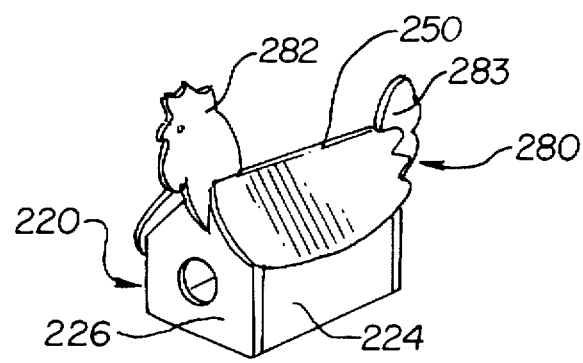
FIG. 15 is a perspective view of the bird house of FIG. 14.
Figure 16:
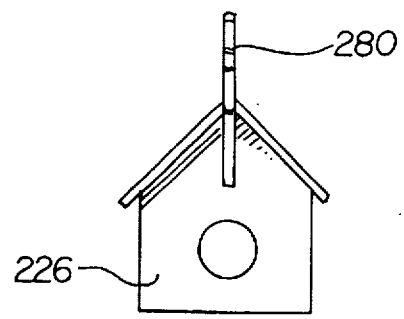
FIG. 16 is an end view of the bird house of FIG. 14.
Figure 17:
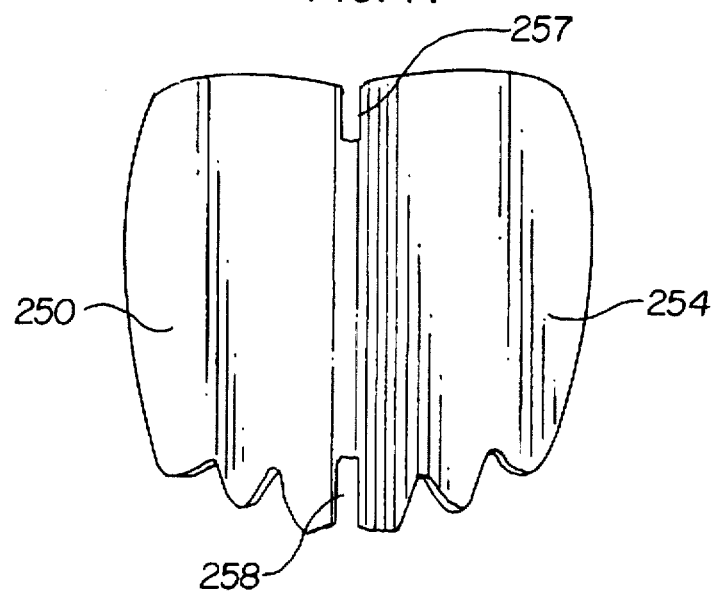
FIG. 17 is a plan view of the roof of the bird house of FIG. 14.

FIG. 15 shows the assembled bird house 220 in which the cross-beam 281 of the decorative element is positioned in the slots 265 and 267. The roof 250 is positioned on the cross-beam 281 and attached to the end walls by a number of fasteners such as nails, screws or an adhesive. The front and rear portions 282 and 283 extend vertically upward through the front and rear slots 257 and 258, respectively, in the roof section.

While a preferred embodiment of the present invention has been described, it should be understood that various changes, adaptations and modifications may be made therein without departing from the spirit of the invention and the scope of the appended claims.

What is claimed is:

1. A decorative bird house, comprising:
   a plurality of panels configured to define an interior cavity, at least two of the panels being side panels extending generally upwardly and have upper edges extending lengthwise of the bird house;
   a pitched roof having an apex extending lengthwise of the bird house, the roof having at least two separate sections secured adjacent to the upper edges of the side panels, the roof sections being spaced from each other to define a slot therebetween, the slot extending from the upper edge of one of the side panels to the upper edge of the other side panel, the slot being positioned transversely to the upper edges of the side panels and the apex; and a thin, generally flat decorative element disposed in the slot, the decorative element being securely attached to one of the roof sections and extending vertically above the roof.

2. The bird house of claim 1, wherein the side panels are two side walls connected to each other lengthwise along a joint and extending generally divergently upwardly therefrom to form a generally V-shape, the plurality of panels also including two end walls attached to opposing ends of the side walls, respectively.

3. The bird house of claim 1, wherein the side panels are generally vertically oriented side walls, the plurality of panels also including a horizontal base and two end walls attached to opposing ends of the side walls.

4. The bird house of claim 3 wherein at least one of the side walls includes a generally vertically oriented channel aligned with the slot between the roof panels, the channel receiving a portion of the decorative element therein.

5. The bird house of claim 3 wherein both side walls include a generally vertically oriented channel aligned with the slot between the roof panels, the channels receiving a portion of the decorative element therein.

6. The bird house of claim 5 wherein the side wall includes an outer surface, the channel comprising a partial thickness groove in the outer surface of the side wall.

7. The bird house of claim 5 wherein the channel comprises a full thickness cut through the side wall extending downwardly from the upper edge of the side wall.

8. The bird house of claim 7 wherein the channel extends from the upper edge of the side wall for only a portion of the height of the side wall.

9. The bird house of claim 1 wherein the decorative element is securely attached to both of the roof sections.

10. A decorative bird house, comprising:
a plurality of panels configured to define an interior cavity, at least two of the panels being side panels extending generally upwardly and have upper edges extending lengthwise of the bird house;

a pitched roof having an apex extending lengthwise of the bird house, the roof having at least two separate sections secured adjacent to the upper edges of the side panels, the roof sections being spaced from each other to define a slot therebetween, the slot extending from the upper edge of one of the side panels to the upper edge of the other side panel, the slot being positioned transversely to the upper edges of the side panels and the apex; and a thin, generally flat decorative element disposed in the slot, the decorative element extending vertically above the roof.

11. The bird house of claim 10 wherein the decorative element is attached to one of the side panels.

12. The bird house of claim 10 wherein the decorative element is attached to one of the roof sections.

13. The bird house of claim 10 wherein the decorative element is attached to both of the roof sections.

14. A decorative bird house, comprising:
a plurality of panels including end walls, sidewalls and a floor configured to define an interior cavity, each end wall having a side portion, chords extending convergently upward to an apex and a slot at the apex;

a first decorative element having a support beam with a decorative portion, the first decorative element being positioned in the slots of the end walls; and a second decorative element defining a roof section, the second decorative element having a roof slot for receiving the decorative portion of the first decorative element.

15. The decorative bird house of claim 14 wherein the decorative portion of the first decorative element includes a front portion and a rear portion on opposing ends of the support beam, and the roof slot of the second decorative element includes front and rear slots for receiving the front and rear portions, respectively, of the first decorative portion.

* * * * *